United States Patent [19]

Sawyer, III et al.

[11] Patent Number: 5,339,524
[45] Date of Patent: Aug. 23, 1994

[54] PISTACHIO NUT OPENER

[76] Inventors: Kenneth C. Sawyer, III, 245 Dahlia St., Denver, Colo. 80220; Mark C. Esbenson, 4349 Zenobia St., Denver, Colo. 80212

[21] Appl. No.: 981,547
[22] Filed: Nov. 25, 1992
[51] Int. Cl.⁵ .............................................. A47J 25/00
[52] U.S. Cl. ..................... 30/113.2; 30/120.2
[58] Field of Search ............... 30/120.1, 120.2, 113.1, 30/113.2; D7/680, 693; 99/568

[56] References Cited

U.S. PATENT DOCUMENTS

| 1,428,789 | 9/1922 | Lawson | 30/113.1 |
| 1,622,309 | 3/1927 | De Forest | 30/113.2 |
| 3,074,449 | 1/1963 | Mikulas | 30/120.2 |
| 4,462,156 | 7/1984 | Himelhoch | 30/120.2 |

FOREIGN PATENT DOCUMENTS 261934  6/1949  Switzerland ........... 30/113.2

Primary Examiner—Richard K. Seidel
Assistant Examiner—Hwei-Siu Payer
Attorney, Agent, or Firm—John E. Reilly

[57] ABSTRACT

A nut opener comprises a wire formed into a coiled spring with lever arms extending from opposite sides of the spring and terminating in pointed extremities in the form of knife edges which are insertable into the opening between half shells of the nut and, when the arm members are manually squeezed, will spread the pointed extremities to open the shell.

9 Claims, 1 Drawing Sheet

PISTACHIO NUT OPENER

This invention relates to a hand-held opening device; and more particularly relates to a novel and improved hand-held device for opening or shelling edible nuts, such as, pistachio nuts but is equally useful in separating or prying open certain shellfish as well as certain types of pry-open lids or bottle caps.

BACKGROUND AND FIELD OF THE INVENTION

Various types of hand-held devices have been devised for shelling or shucking the shells of nuts and which basically comprise some form of sharply pointed implement which can be inserted into the slit or opening between the half shells each nut and in some manner pried to separate the halves away from the meat of the nut. Pistachio nuts, however, present particular problems by virtue of their relatively small size and the difficulty of grasping the nut while manipulating a tool to pry or separate the half shells.

Of the approaches taken in the past, U.S. Pat. No. 4,317,281 to Yowa discloses a somewhat pick-like opener in which one end can be held between the thumb and forefinger and the opposite spoon-shaped end has a sharply pointed tip which is inserted into the slit between the shells and manipulated to pry open the shells. U.S. Pat. No. 4,462,156 to Himelhoch employs pointed ends in face-to-face relation to one another at the ends of a pair of levers with bumpers or loop-shaped enlargements associated with the pointed ends to limit the extent or degree of penetration of the pointed ends into the slit between the half shells following which the pointed ends are spread apart to separate the half shells. This approach is desirable from the standpoint of being able to apply lever action to the pointed ends in prying the shell open but presupposes that there is a sufficient opening between the half shells to permit insertion of the double thickness of the ends when disposed in face-to-face relation.

It is therefore desirable to provide a tool which possesses the advantages of a pick-like instrument in having a single blade thickness to insert into the narrow pistachio nut opening combined with the prying action or force realized with the use of a double-ended tool in which the ends can be spread under lever action. Moreover, it is proposed to provide such a tool of one-piece construction in which the lever action is improved by establishing a greater separation between the lever arms which can be more easily grasped in the hand and squeezed, as opposed to closely spaced levers which must be squeezed between the fingers of the hand.

SUMMARY OF THE INVENTION

Accordingly, it is an object of the present invention to provide for a novel and improved device for opening the shells of edible food including but not limited to various types of nuts and shellfish in a rapid and efficient manner.

It is another object of the present invention to provide for a novel and improved hand-held device for shelling or shucking edible nuts and shellfish which facilitates insertion of the opener between the half shells of the article and which achieves a highly effective lever action in separating the half shells to expose the edible portion or meat contained therein.

An additional object of the present invention is to provide for a novel and improved hand-held device which is compact, of low-cost construction and easy to manufacture while being highly durable and easy to use.

It is a still further object of the present invention to provide for a novel and improved nut sheller of one-piece construction which facilitates insertion and prying open of the half shells of the nut with a minimum degree of manual force required.

In accordance with the present invention, there has been devised a novel and improved nut opener for shelling an edible nut, such as, a pistachio nut comprising a pair of end members, each of the end members terminating in a pointed extremity, and resilient lever means for mounting the end members in juxtaposed relation to one another when in the relaxed state with the pointed extremities extending in a common direction and disposed sufficiently close to one another to enter an opening in the nut to be opened whereby squeezing the resilient lever means will cause the end members to spread apart and open the nut. Preferably, the pointed extremities are in the form of knife edges disposed in a common plane so as to be capable of insertion into the narrowest possible openings or slits between the half shells, and the resilient lever means are defined by arm members with a spring member therebetween which will enable gripping in one hand and squeezing to spread apart the end members once inserted into the opening between the half shells.

Other objects, advantages and features of the present invention will become more readily appreciated and understood when taken together with the following detailed description in conjunction with the accompanying drawings, in which:

DETAILED DESCRIPTION OF THE PREFERRED EMBODIMENTS

Figure 1:
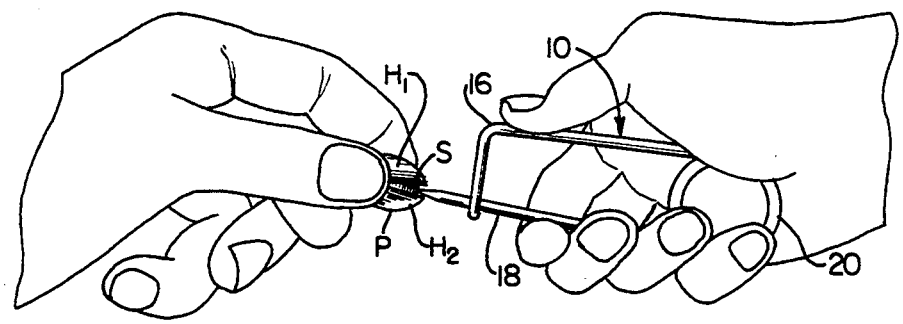
FIG. 1 is a somewhat perspective view illustrating the use of a preferred form of nut sheller in accordance with the present invention.
Figure 3:
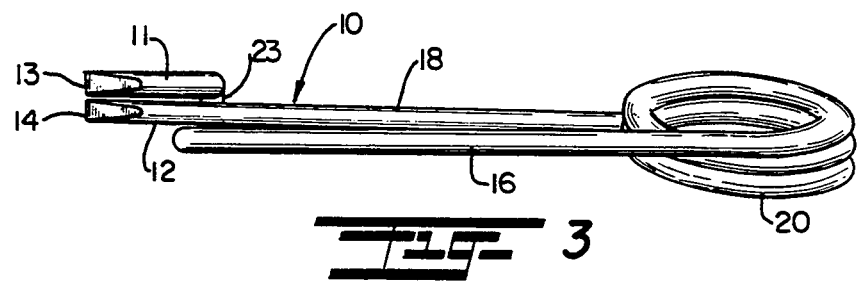
FIG. 3 is a top plan view of the preferred form of nut sheller shown in FIG. 2.

Referring in detail to the drawings, there is illustrated in FIGS. 1 to 4 a preferred form of nut sheller 10 in accordance with the present invention and which is specifically designed for use in shelling pistachio nuts, although it is readily conformable for use in opening the shells of other edible products, such as, shellfish. Broadly, the nut sheller is comprised of a pair of end members 11 and 12, each having a pointed tip or extremity 13 and 14, respectively. The end member 11 forms a continuation of a first elongated arm member 16, and the second end member 12 forms a continuation of a second arm member 18, the arm members 16 and 18 extending in spaced parallel relation to one another from diametrically opposite sides of a common coiled spring member 20 at an opposite end of the arm members to the first and second elongated end members 11 and 12. As such, the arm members 16 and 18 in cooperation with the coiled spring member 20 define resilient means for manipulating the end members in a manner to be hereinafter described.

The preferred form of nut sheller 10 is of one-piece construction being constructed out of piano wire or any other type of flexible, sturdy and durable wire. The wire extension which defines the first arm member 16 is bent to include a transversely extending portion 22 and is further bent to define an offset or return portion 23 with a final bend terminating in the pointed end member 11. In this way, the end member 11 extends in offset, spaced parallel relation to its arm member 16, and the offset or return portion 23 forms a generally U-shaped recess for retention of the second end member 12. The end member 12 defines a direct axial extension of its arm member 18 and when positioned in the return portion 23 is coextensive with and in juxtaposed, contiguous relation to the first end member 11.

The pointed extremities 13 and 14 are formed into knife edges and this is preferably done by filing or grinding the extremities into flattened, sharply pointed edges which will fit into the narrow opening or slit between the half shells of the pistachio nut.

Figures 2, 4:
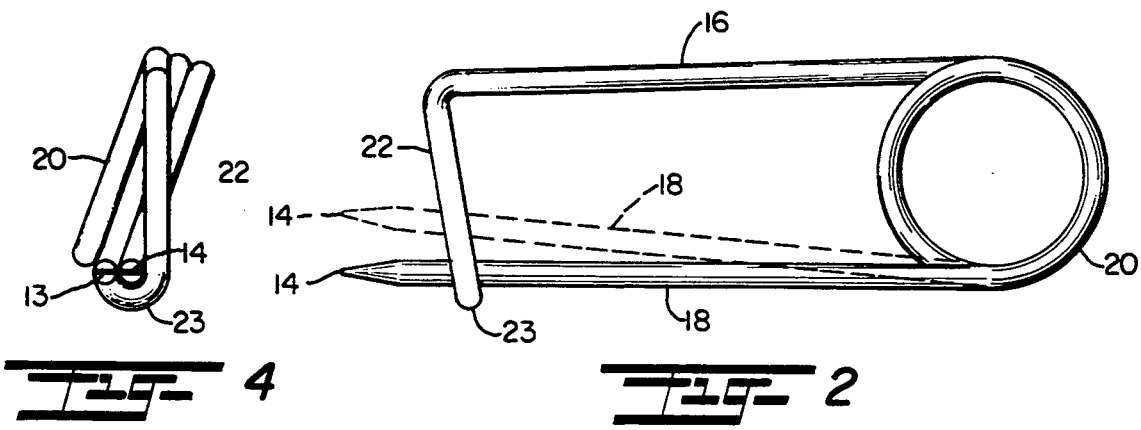
FIG. 2 is a side view in elevation of the preferred form of nut sheller and illustrating movement of the arms in performing the shelling operation.
FIG. 4 is a front end view of the preferred form of nut sheller in accordance with the present invention.

FIG. 1 illustrates the manner in which the nut sheller 10 is employed to shell a pistachio nut generally designated at P and which is held between the thumb and forefinger of one hand so that the slit S between the half shells $H_1$ and $H_2$ of the nut is facing away from the hand. The nut sheller 10 is gripped in the other hand with the arm members 16 and 18 essentially passing between the fingers and crease between the thumb and palm of the hand, the coiled spring member 20 resting in the palmar region and the thumb extending along the first arm member 16. The pointed extremities 13 and 14 are inserted into the slit S and by squeezing the arm members 16 and 18 together will cause the pointed extremity 14 to move away from the extremity 13 with the end member 12 sliding along the transversely bent portion 22, for example, as illustrated in FIG. 2 to pry the half shells open and to expose the meat within the shell. When the squeezing pressure is removed from the arms 16 and 18, the spring member 20 will of course cause the arm 18 and its pointed extremity 14 to return to its original position alongside and coextensive with the pointed extremity 13. In this regard, the flattened edges of the pointed extremities 13 and 14 are not only coextensive but in a common flat plane which extends in a direction substantially parallel to said end members with their adjacent side edges touching one another, or substantially so, to essentially define one common edge as a result of which the pointed extremities or knife edges 13 and 14 can be readily inserted into the smallest opening. If the nut shell is effectively closed shut, a corner of one of the pointed extremities can be used to initially spread the half shells apart to an extent necessary for insertion of both pointed extremities 13 and 14. Although the opening device of the present invention has been described specifically in relation to prying open nut shells, it will be readily apparent that it has useful application to other articles, such as, shellfish and bottle caps of the pry-open type.

It is therefore to be understood that while a preferred form of invention is herein set forth and described, various modifications and changes may be made to the invention without departing from the spirit and scope thereof as defined by the appended claims and reasonable equivalents thereof.

We claim:

1. A nut opener for shelling an outer shell of an edible nut, such as, a pistachio nut comprising:
   a pair of end members, each of said end members terminating in a pointed extremity;
   resilient means normally urging said end members away from one another; and
   mounting means for mounting sad end members in juxtaposed relation to one another against the urging of said resilient means with said pointed extremities extending in a common direction and in close proximity to one another to enter an opening in the nut to be opened whereby manually squeezing said resilient means will cause said end members to spread apart and open the shell of the nut, each of said end members being elongated and said mounting means having a transversely bent portion and an offset portion connected to said one of said end members, said offset portion extending from said bent portion and being engageable with the other of said end members to normally retain said end members in juxtaposed relation to one another against the urging of said resilient means.

2. A nut opener according to claim 1, said pointed extremities being in the form of knife edges disposed in a common plane against the urging of said resilient means.

3. A nut opener according to claim 1, said resilient means including a pair of arm members, each of said arm members having one of said end members at one end thereof, and a spring member disposed between said arm members.

4. A nut opener according to claim 3, said arm members being elongated, and said spring member disposed at ends of said arm members opposite to said end members.

5. A nut opener according to claim 4, said spring member being in the form of a coiled spring, each of said arm members defining a continuation of one end of said coiled spring.

6. A hand-held opening device, comprising:
   a single length of wire including a pair of elongated end members, each of said end members terminating in a pointed extremity, each of said extremities being in the form of a flat knife edge, a wire coil defining a sprig member, and a pair of lever arm members extending from said spring member including means for mounting said end members in juxtaposed, contiguous relation to one another against the urging of said spring member, said knife edges being coextensive and disposed in a common flat plane which extends in a direction substantially parallel to sad end members by said mounting means against the urging of said spring member to enter an opening in an article to be opened whereby manually squeezing said lever arm members against the urging of said spring member will cause said end members to spread apart and open the article.

7. A hand-held opening device according to claim 6, said lever arm embers each having one of said end members at one end thereof, and said spring member being a coiled spring disposed at ends of said lever arm members opposite to said end members.

8. A hand-held opening device according to claim 7, each of said arm members being elongated, and said mounting means including a transversely bent portion on one of said lever arm members and an offset return portion at one end of said transversely bent portion engageable with the other of said lever arm members to retain said end members in juxtaposed relation to one another against the urging of said spring member.

9. A hand-held opening device according to claim 11, said lever arm members extending in spaced parallel relation to one another from diametrically opposed ends of said spring member when said end members are retained in juxtaposed relation to one another.

* * * * *